March 28, 1967     S. H. FRISHAUF     3,311,201

AUTOMOBILE BRAKING SYSTEM

Filed Oct. 23, 1965

Stephen H. Frishauf
INVENTOR

United States Patent Office 3,311,201
Patented Mar. 28, 1967

3,311,201
AUTOMOBILE BRAKING SYSTEM
Stephen H. Frishauf, 209 W. 8th St.,
New York, N.Y. 10024
Filed Oct. 23, 1965, Ser. No. 503,738
8 Claims. (Cl. 188—134)

The present invention relates to automobile braking systems for automobiles having front wheel drive.

Automobiles with front wheel drives, that is automobiles in which the front wheels are driven rather than rear wheels so that the rear wheels are free running, have the undesirable property that, when engine braking is resorted to, particularly when the car is going down hill, the entire automobile tends to pivot about the front wheel. This may be dangerous, particularly when the road surface is wet or slippery. For cars of very small size and of a short wheel base, this undesirable effect may not be too serious; for large size automobiles, however, front wheel engine braking may be dangerous, and the engine drag on the front wheels can make steering difficult. For a discussion of this problem see for example "Motor Trend," May 1965, page 44 et seq.

It is an object of the present invention to provide a braking arrangement for automobiles having front wheel drive, in which the rear brakes are applied, rather than braking effort being transmitted to the front wheels in driving situations where engine braking would be utilized with rear wheel driven automobiles.

Briefly, in accordance with the present invention, means are provided to sense the direction of transfer of power between engine and the front wheels, that is the driven wheels. A signal is obtained, which may be either hydraulic, pneumatic, or electrical, corresponding to the power being transferred between front wheels and engine in the direction of wheel to engine, or of relative speed between engine and wheel; this signal is then utilized to control the application of braking effort to the rear wheels.

The application of braking effort to the rear wheels can best be done by applying a small amount of brake fluid compression to the rear wheels only. Cars having separate front and rear wheel braking systems can be controlled from the rear wheel master cylinder; for other automobiles, separate arrangements may have to be provided. For any type of construction, however, the invention provides application of braking power to the rear wheels by conventional means, preferably utilizing existing braking equipment.

Figure 1:
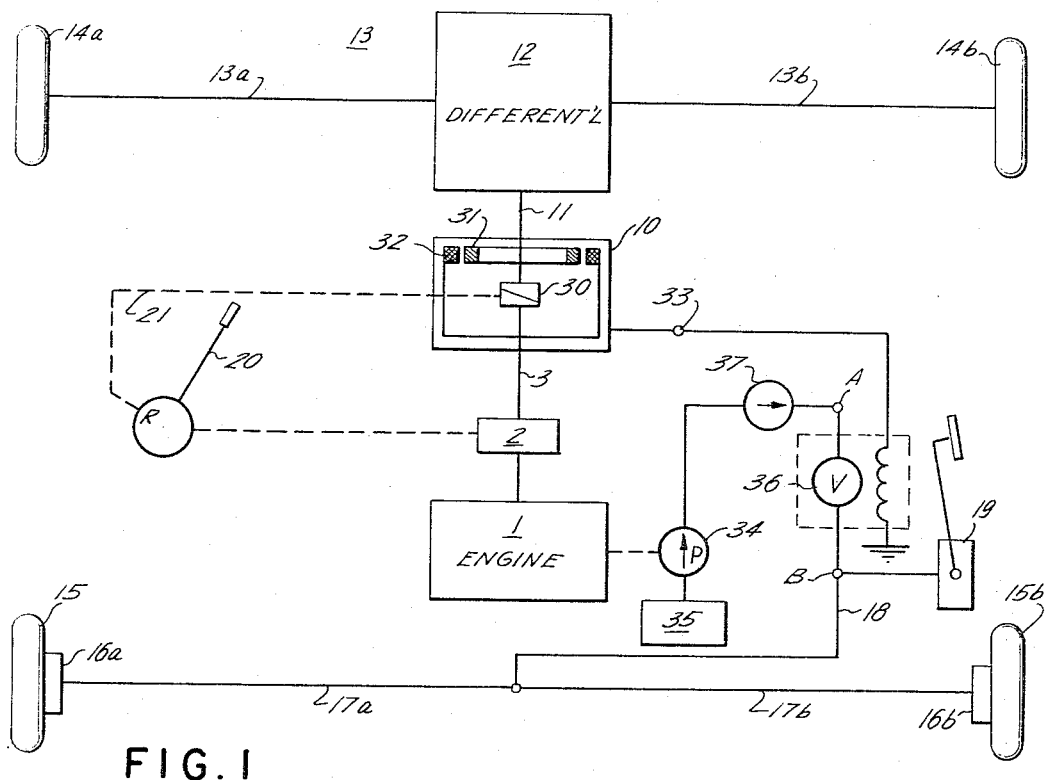
Figure 2:
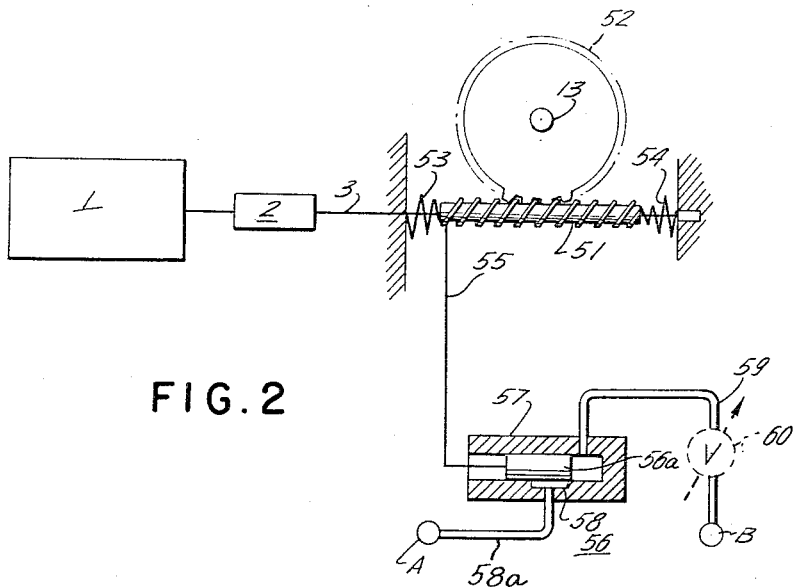

The structure, organization and operation of the invention will now be described more specifically in the following detailed description with reference to the accompanying drawings, in which:

FIG. 1 is a schematic diagram of one form of the invention in which free wheeling is provided; and FIG. 2 is a schematic diagram of an alternative form of the invention utilizing hydraulic controls.

The details of the construction of the mechanism, and of any other part of the automobile will not be shown, nor explained, because all the components utilized in the structure of the present invention, by themselves, are well known in the art. For pictorial representation of this mode of carrying out the invention, and all surrounding equipment standard in the automotive field, reference is had herewith to "Principles of Automotive Vehicles," Department of the Army Technical Manual "TM 9-2700," TO 36A-1-76, January 27, 1956, illustrating in great detail and describing all standard components with which the structure of the present invention cooperates.

Referring now to FIG. I, the automobile engine is schematically illustrated by block 1; it is connected through a drive train to a clutch and transmission, which may be manual, automatic, or of any kind desired, and indicated by block 2. The output shaft of the transmission is shown schematically at 3. This output shaft is connected to a direction of power transfer sensing unit 10, which will be further described. The output from unit 10 is shaft 11, connected over a standard differential 12 to drive shafts 13a, 13b and then to front wheels 14a, 14b. The rear wheels, free running and not driven, are shown schematically at 15a, 15b, each one being supplied with brakes, 16a, 16b, which may be standard drum or disc brakes. The rear wheel brakes 16a, 16b are operated by brake fluid lines 17a, 17b connected by a line 18 to the brake operating mechanism shown schematically only at block 19, and which may be of any conventional type as referred to in the above-identified publication. One additional element, standard in any automobile, is shown—the gear shift lever 20 which controls the manual, or automatic transmission 2 in a well-known manner.

When a driver, driving a car, removes his foot from the gas pedal or accelerator, the car does not merely coast but power is being transmitted from the wheel to the motor. Due to the internal friction of the motor, which is now being fed insufficient amount of gasoline for running at the speed required by the wheels, the engine will exert a braking effort. Such braking effect with front wheel drive is undesirable, as has been pointed out. Such braking effect can be avoided by incorporating in the drive train, that is between shafts 3 and 11, a free-wheeling arrangement or one-way clutch. This clutch is shown, schematically, at 30 and incorporated in the direction of power transfer sensing unit 10. The free-wheeling arrangement, or one-way clutch 30, may be similar to the well-known free-wheeling arrangement incorporated in overdrives and disclosed and discussed in the aforementioned publication. Further reference to the detailed construction of over-drive units, separate braking units, and the like may be had by reference to any automotive repair handbook. A one-way clutch, or free-wheeling arrangement, prevents feedback of power from the wheels to the engine; the wheels may run faster than the engine and driving connection therebetween is interrupted. Thus, when the driver releases his foot from the accelerator, that is, when he would obtain engine braking in a car not having free-wheeling arrangements, the shaft 11 connected to the wheels 14a, 14b may turn at a faster rate than the engine 3 which is now at idling speed. This difference in speed between shafts 3 and 11 is used to obtain a control signal. This control signal may, for example, be obtained by mounting on shaft 11 the series of small magnets, schematically indicated at 31, which cooperate with sensing coils 32 secured to shaft 3 and exposed to the magnetic field of magnets 31. Electric current from coils 32 is taken off, for example by slip rings, and will appear on an output line 33. The electrical signal on line 33 is utilized to control auxiliary hydraulic pressure applied to the brake line 18.

In order to obtain auxiliary hydraulic pressure, a small oil pump 34, connected to the oil reservoir 35, standard with any automobile, is driven from engine 1, as schematically indicated by the dashed lines. Oil under pressure from pump 34 is applied to an electrically controlled valve 36, which valve is connected to line 33 as shown. If a signal appears due to relative rotation of shaft 11 and shaft 3, valve 36 will be opened, permitting oil under pressure to be applied to brake line 18 and thence to the rear brakes 16a, 16b. In order to prevent damage to pump 34, valve 36 may be constructed with a built-in check feature, or a separate check valve 37 may be inserted into the line from pump 34 to valve 36. If the signal from the magnet-coil combination 31, 32 is not strong enough, a small solid state amplifier may be inserted in line 33, powered by the electrical system of the car. Since engine braking by a driver is ordinarily desired only at higher speeds, that is at a time when the relative difference between shafts 3 and 11 is substantial, enough electrical output is available at line 33 to operate valve 36.

In order to provide for reverse motion of the car, that is reverse driving, an interlock is provided from gear shift lever 20 to the one-way clutch, to disable the free-wheeling feature. This disabling line is schematically shown by dashed connection 21 and may consist of a Bowden cable, connected to the gear shift lever and operated in the "reverse" position of the shift. The disabling of the free-wheeling feature may be in accordance with the disabling mechanism present in overdrive transmissions, as illustrated for example in any of the aforementioned technical manuals, or may include an additional splined positive clutch part connection with the overdrive unit and engaged only upon operation of disabling line 21.

Sensing of the direction of power transfer, as described, was accomplished by sensing the relative speed of rotation between the wheels, and the engine, and using a one-way, or free-wheeling clutch. Use of such a free-wheeling clutch has the advantage that front wheel engine braking can never occur, and thus pivoting of the car about the front wheels is entirely avoided. For some purposes it may be desirable to have 4-wheel braking effects, that is, to add mechanical braking of the rear wheels to the retarding of the front wheels connected to the engine when the engine is fed insufficient fuel to maintain the speed of the wheels. FIG. 2 illustrates an embodiment of the form of the invention which senses the direction of power transfer. Output shaft 3, transmitting power from the transmission 2, is schematically shown as connected to a worm drive consisting of a worm 51, and wheel 52 engaged therewith; wheel 52 may be part of the differential mechanism, and instead of worm 51, the ordinary differential transmission gear, or hypoid gear may be utilized. Worm, or gear (whichever is used) 51 is mounted on shaft 3 so as to provide for axial movement, for example by being splined, to the shaft, permitting a small lengthwise excursion. Worm (or gear) 51 is held in position at a certain point on matching gear 52 by means of springs 53, 54. The amount of axial movement of worm (or gear) 51 permitted by springs 53, 54 should be about the amount of back-lash, or clearance ordinarily present in gears of automotive type, that is a very small distance, but a measurable one. Springs 53, 54 are backed up for example against the housing of the differential, or the mechanism in which the gears 51, 52 are enclosed, as schematically indicated.

Axial motion of worm (or gear) 51 is sensed, for example by connection by means of a fork to the worm, or a pin 55 to the gear. The hydraulic control valve 56 is operated by displacement of the pin, and permits fluid under pressure from pump 34 to be applied to brake line 18. FIG. 2 illustrates connection of pin 55 to a piston 56, slidable within a housing 57. Oil under pressure is applied through an elongated slot 58 within the housing, which slot is entirely blocked when the gear is in its neutral, or forward position as would be the case when power is being transmitted from engine 1 over shaft 3, worm (or gear 51) and to wheel 52. When power is transmitted in the reverse direction, spring 53 would compress, pin 55 move to the left and opening elongated slot 58 to the interior of housing 57. The communication is provided from the interior by means of output tubing 59. Input line 58a, communicating with elongated slot 58, and output line 59 are connected at points A, B of elements 35, 34, 18, 19, 16a, 16b of FIGURE 1. It will be seen that the amount of brake fluid supplied from point A to point B, when the system of FIG. 2 is substituted for the system sensing difference in speed of FIG. 1, will be proportional not to the difference in speed between engine 1 and the wheels but rather to the relative power between shaft 13 and shaft 3. Thus, braking effort applied to the rear wheels from line B and over point 18 will be proportional to the driving effect of the wheels on the engine, and independent of speed of the engine. Thus, a greater braking effort will be applied to the rear wheels when a car equipped with the structure of FIG. 2 is slowly starting down a steep hill, than with the embodiment of FIG. 1, where slow motion of the front wheels may not cause a substantial relative rotation between magnets 31 and 32. Of course, as soon as the car speeds up, braking effort will be applied to the rear wheels, also by the structure of the embodiment of FIG. 1.

The embodiment of FIG. 2 does not require any interlock with the gear shift, since the direction of power transferred to the wheel controls the braking and this direction of power transfer is independent of the direction of motion of the car. The embodiment according to FIG. 2 applies braking effort to the rear wheels in addition to the engine braking provided by the drive train and the connection of wheels 14 with the engine 1. The amount of braking pressure applied at point B′ must therefore be great enough to overcome the engine braking effect; a pressure reducing adjustment valve in line 59, indicated in dashed formed at 60, may therefore be desirable in order to accommodate different driving conditions.

The invention thus relates to a power transfer direction sensitive braking means for motor vehicles, and comprising a sensing means to sense the direction of transfer of power between engine and drive wheels; this sensing means may be electrical (FIG. 1: 31, 32) or mechanical (FIG. 2: 51 being movably mounted; 53, 54, 55) and a controlled hydraulic valve (FIG. 1: 36; FIG. 2: 56, 58, 59) to apply brake fluid under pressure to the rear wheels; and a connection (FIG. 1: 33; FIG. 2: 55) to transmit the sensed signal to the auxiliary valve to apply additional hydraulic braking fluid under pressure to the rear wheels of the car when the sensing means detects transfer of power from the wheels to the engine rather than driving, or tractive effort from the engine to the wheels.

Other means to detect transfer of power from the wheels to the engine, with or without the use of the one-way clutch or overdrive mechanism may be used; braking effort may also be transmitted, not to the rear wheels individually, but for example to an axle interconnecting the rear wheels. Hydraulic amplifiers, or booster, operated by the engine may be incorporated where necessary; check valves may be used as desired in order to prevent undesirable feedback of hydraulic fluid due to braking by the driver when the braking mechanism 19 (FIG. 1) is operated.

FIG. 2 illustrates displacement of worm (or gear) 51 in an axial direction. If the design of the component of the vehicle requires, displacement can of course also be circumferentially; thus, a small amount of play may be permitted by one gear of the transmission, connected to the engine, with respect to another gear connected to the wheels, for example, a hypoid gear in a differential; and the rotational displacement of this wheel, having play, in one direction or the other depending upon the transfer of power, can then be used to open, or close the hydraulic ducts connected at points A, B, FIG. 2. Such rotational displacement could be used, directly, for example, to control hydraulic ducts drilled through the center of a shaft on which the displaceable gear is mounted. Similarly, a control signal can be obtained hydraulically in a system having a one-way or over-running clutch, as discussed in connection with FIG. 1, by obtaining a hydraulic pressure signal from a small turbine and having relatively movable elements similar to electrical elements 31, 32. Such hydraulic control signals, dependent upon relative speed of wheels and engine may, for certain constructions, be already available in certain automatic transmissions, and thus could be used directly to control this rear braking system of the vehicle.

What is claimed is:

1. In a braking system for a motor vehicle having an engine, forward wheels driven by said engine and having free running rear wheels, brakes effective on said rear wheels, and means actuating said rear wheel brakes including a supply of brake fluid under pressure, and a brake fluid line interconnecting said supply of brake fluid and said rear wheel brakes only, said system comprising means sensing the direction of transfer of power between said engine and said forward driven wheels; and a valve controlled by said sensing means in said brake fluid line to said rear wheels only, said controlled valve admitting brake fluid under pressure to said rear wheel brakes upon sensing of transfer of power from the forward wheels to the engine by said sensing means.

2. System as claimed in claim 1, said engine having an output shaft, rotation transmitting means interconnecting said output shaft and said forward driven wheels and including a rotary element and said sensing means; said sensing means including means movably mounted on said rotary element to move in a direction determined by the direction of transfer of power between said engine and said forward driven wheels; means sensing the direction of movement of said movably mounted means upon transfer of power from the forward wheels to the engine; said controlled valve being governed by the movement of said movably mounted means.

3. Braking system as claimed in claim 2, said rotary element being a shaft and said movably mounted means being a gear means movably mounted on said last named shaft for slight displacement; said controlled valve and said movably mounted gear means being interconnected by said means sensing the direction of movement of said movably mounted means to control said valve by movement thereof and thus control supply of brake fluid under pressure to said rear wheels.

4. Braking system as claimed in claim 3 wherein said last named gear means is axially movable and splined to said last named shaft; and said means interconnecting said axially movable gear and said controlled valve includes link means to control said valve in accordance with the displacement of said gear.

5. Braking system as claimed in claim 1 wherein said sensing means includes a one-way clutch interconnecting the engine and the shaft of the driven wheels, and arranged to transmit power from the engine to the forward driven wheels; electric coil and magnet means associated with the shaft from said engine and the shaft from said forward wheels, respectively, and sensing differences in speed between said shafts when said one-way clutch is in overrunning condition; said sensing means applying an electrical signal to said controlled valve.

6. Braking system as claimed in claim 1, wherein said means actuating said rear wheel brake means includes an additional auxiliary hydraulic fluid pressure pump; said valve being connected to said pump and to said brakes effective on the rear wheels of the motor vehicle; said controlled valve being operated upon sensing of transfer of power from the forward wheels to the engine by said sensing means.

7. Braking system as claimed in claim 6, said controlled valve being an electrically operated valve; said sensing means comprising electro-magnetic means the output signal from said electro-magnetic means being applied to said electrically controlled valve.

8. Braking system as claimed in claim 6, said sensing means being a mechanical means having distance displacement upon transfer of power from the forward wheels to the engine; said controlled valve being operated in proportion to said mechanical displacement.

References Cited by the Examiner
UNITED STATES PATENTS

| | | | |
|---|---|---|---|
| 1,953,366 | 4/1934 | Rockwell | 188—134 |
| 2,008,403 | 7/1935 | Rockwell | 188—134 |
| 2,251,466 | 8/1941 | Payson | 188—134 X |
| 3,169,595 | 2/1965 | Shepherd | 180—1 |

A. HARRY LEVY, *Primary Examiner.*